Figure 1:
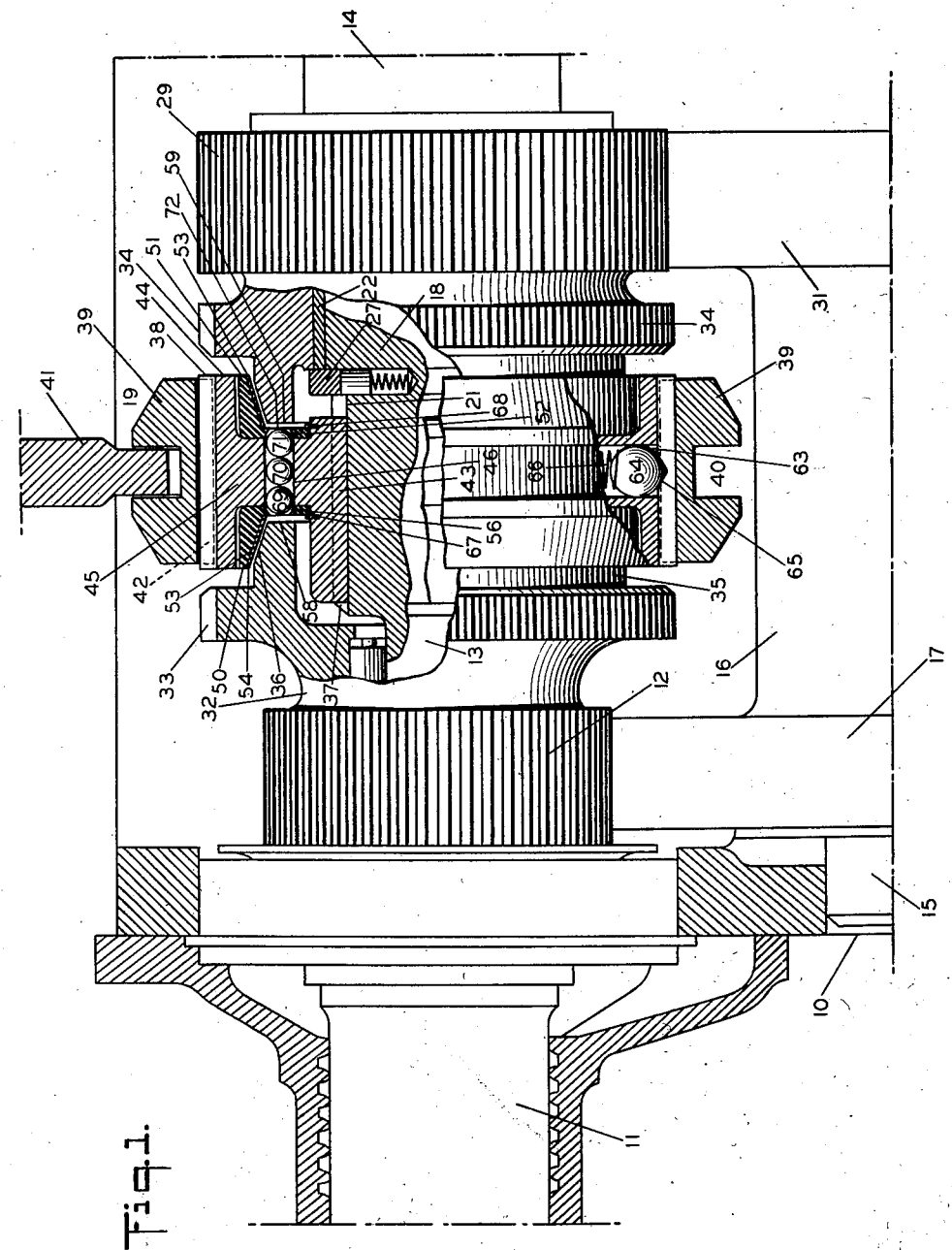

June 9, 1936.    H. J. MURRAY    2,043,807
BALL TYPE CAM SYNCHRONIZER
Filed July 21, 1933    2 Sheets-Sheet 1

INVENTOR
HOWARD J. MURRAY
BY
Warren S. Orton
ATTORNEY

June 9, 1936.   H. J. MURRAY   2,043,807
BALL TYPE CAM SYNCHRONIZER
Filed July 21, 1933   2 Sheets—Sheet 2
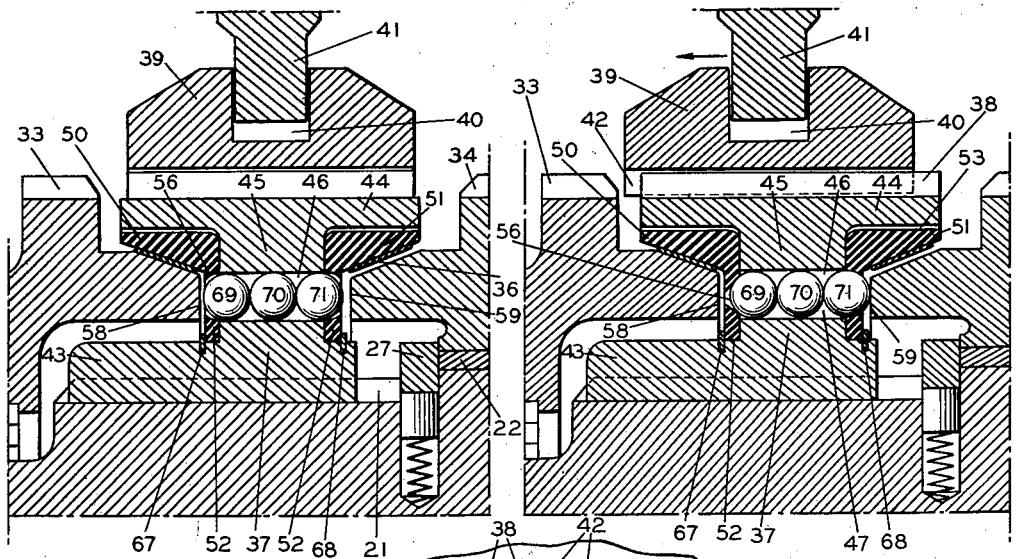
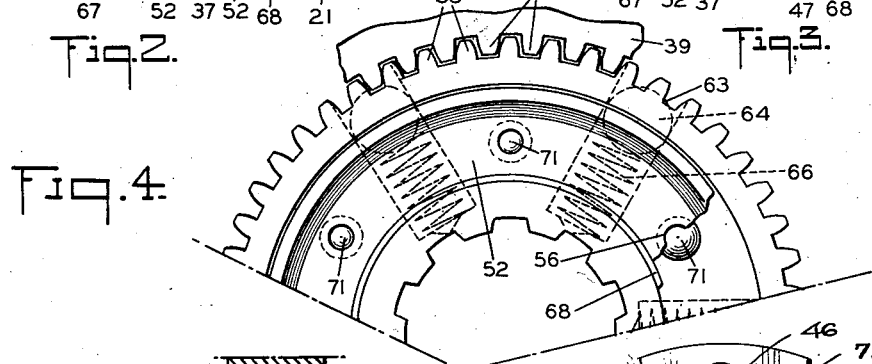
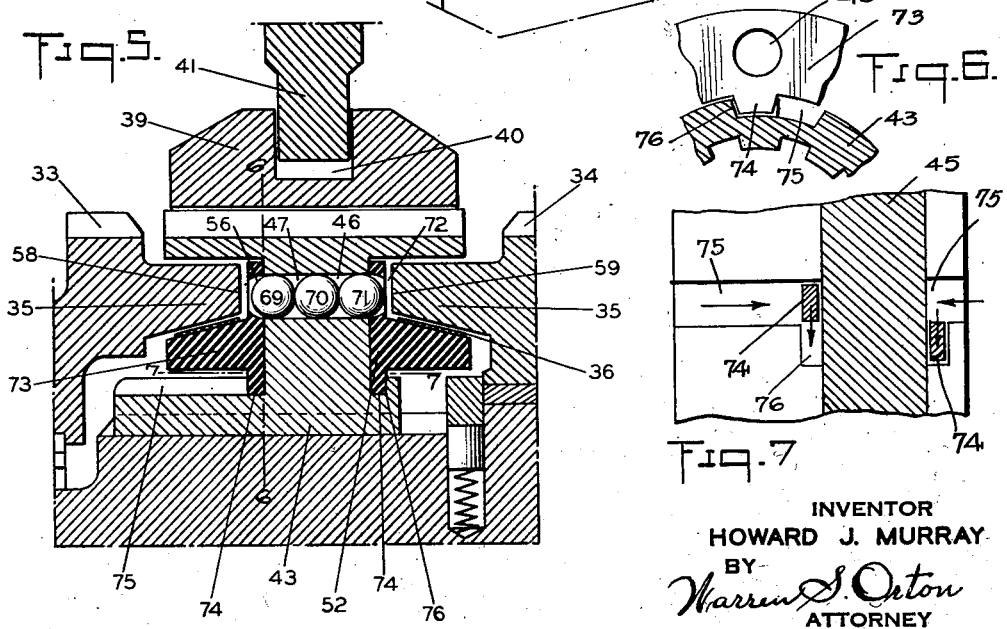
INVENTOR
HOWARD J. MURRAY
BY
Warren S. Orton
ATTORNEY Patented June 9, 1936

2,043,807

UNITED STATES PATENT OFFICE 2,043,807

BALL TYPE CAM SYNCHRONIZER

Howard J. Murray, New York, N. Y., assignor, by mesne assignments, to Borg-Warner Corporation, Chicago, Ill., a corporation of Illinois Application July 21, 1933, Serial No. 681,420

19 Claims. (Cl. 192—53)

The invention relates to a synchronizing device for synchronizing the speeds of clutches, gears and the like, before they are moved into intergeared or interclutched relation, by the interposition of a friction clutch drive, and the present invention constitutes a development of the synchronizing device disclosed in my co-pending application entitled "Synchronizing devices for automotive vehicles", Serial No. 651,315 filed January 15, 1933.

The present invention like that disclosed in the pending application has for its primary object the providing of a simplified form of self-energized synchronizer particularly designed for installation in a known form of change speed transmission mechanism.

The pending application featured the use in an organization where a friction form of clutch is interposed between positive clutch elements, of a cam control for the floating friction clutch element and in which both of the co-operative elements of the cam are carried on the member which shifts the friction clutch element into its initial engagement with its companion. In the device disclosed in the pending application the camming element which shifted the friction clutch element is in the form of a sliding pin, or rather a set of pins, for camming a pair of friction clutch elements at opposite ends of the sliding element which moved with it. The present disclosure features a modification of this pin-like camming element in the substitution therefor of a set of spherical camming members with the result that there is attained certain manufacturing advantages, the insurance of positiveness in operation and in general a more perfected type of construction.

The present disclosure also features the providing of a synchronizing device which will be free of the necessity of using springs and similar resetting parts which have been necessary in previously known devices for disconnecting the friction clutch elements when the positive clutch elements have been shifted back into their neutral or inoperative position.

Still another object of the present disclosure is to provide a form of synchronizing mechanism of the cam actuating type designed to minimize wear between relatively moving parts and which parts are designed to distribute wear and in this way minimize the localizing of wear at any particular place and to provide the advantages inherent in rolling contacts to minimize frictional resistance in the camming parts.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the accompanying drawings:

Fig. 1 is a view partly in elevation and partly in vertical section taken axially through the engine end of a change speed transmission of conventional form showing a preferred embodiment of the invention installed therein to effect synchronization of the direct and second speed drives and with the several parts of the synchronizing devices shown in their neutral, inoperative position;

Figs. 2 and 3 are enlarged, longitudinal sectional views taken of the parts shown at the upper central portion of Fig. 1; Fig. 2 showing the relation of the parts at the instant the friction clutch elements have engaged and before the camming device has functioned to increase the intensity of the clutching engagement; and Fig. 3 shows the parts in their immediately succeeding position with the camming device functioning to force the engagement of the elements of the left hand friction clutch;

Fig. 4 is a fragmentary view in end elevation of part of the mechanism shown in the preceding figures;

Fig. 5 is a view corresponding to Figs. 2 and 3 showing a slightly modified form of the invention and with the parts disposed in their inoperative, neutral position corresponding to the position of the similar parts shown in Fig. 1; and Figs. 6 and 7 are detailed views of the mounting member assembly shown in the modified form illustrated in Fig. 5 and are sectional views taken respectively on lines 6—6 and 7—7 of Fig. 5.

In the drawings there is shown an automobile transmission of the constant mesh gear type including a mechanism containing casing 10 into one end of which is intruded an engine shaft 11 provided at the end intruded into the casing with an engine gear 12. The reduced smooth end 13 of a propeller shaft 14 connected to drive the traction wheels of the vehicle as is usual in such constructions is journalled in the inner end of gear 12. There is also disclosed the usual jack shaft 15 with its cluster of jack shaft gears 16 driven from the engine shaft 11 through the end gear 17 of the cluster in constant mesh with the engine gear 12.

Between the unreduced portion 14 and the reduced smooth journalled end portion 13 the shaft is twice reduced; the lowest reduction adjacent the end 13 provided with splines 21 and the other reduced portion 18 being smooth and provided with a bearing ring 22. A power gear 29 is rotatably mounted on the bearing ring 22 and is held from end play by a pair of stop rings one of which is shown at 27 and is in constant mesh with gear 31 of the cluster 16 on the jack shaft. From this construction it is obvious that gear 29 is supported on the propeller shaft and like the engine gear 12 is turning at all times with the engine shaft and is fixed against axial movement.

The adjacent ends of gears 12 and 29 are spaced apart and are of similar form except that they are reversed in position and in each case include an axially extending ring 32 provided with spur gear teeth 33 projecting outwardly from ring 32 of gear 12 and teeth 34 similarly projecting from gear 29 and having the same pitch diameter. Each of these sets of teeth will hereinafter sometimes be referred to as elements of a positive clutch drive.

Projecting towards each other from each of the rings 32 provided with the teeth 33 and 34 is an extension in the form of a ring 35 spaced from the shaft 14, the outer perimeter of which ring is slightly bevelled to form a conical surface 36 hereinafter sometimes referred to as an axially fixed friction clutch element. The ends of the rings 35 form annular stop faces, opposing each other and forming axially fixed abutments for opposite ends of camming devices hereinafter described. The left abutment 58 is spaced slightly from the adjacent plate 52 of the synchronizer 50 and the right abutment or stop face 59 is similarly spaced a short distance from the plate 52 of the right synchronizer 51.

The portion of the shaft 14 which is located between the hub portions of the gears 12 and 29 and which is provided with the splines 21 has keyed thereto a composite slide unit 19 which is keyed to and thus turns with the shaft 14 and is capable of a slight freedom of axial movement from the neutral position shown in Fig. 1 to the left to effect a frictional clutching engagement with gear 12 or to the right into similar friction clutching engagement with the gear 29 as hereinafter described. The slide unit includes two telescoped parts, an inner spool-like mounting member 37 and an outer slide member 39. The mounting member 37 is of wide gear-like form provided at its outer periphery with a line of teeth 38 forming an internal gear drive with the ring-like slide member 39 encircling the same and capable of sliding axially thereon towards either set of the gear teeth 33 or 34. The slide member is provided on its outer periphery with an annular slot 40 in which is contained a yoke fork 41 in turn operatively connected to be shifted by the usual hand lever as is well known in automobile transmission mechanisms. The slide member is provided on its inner periphery with long internal spur gear teeth 42 constantly in mesh with teeth 38.

The mounting member 37 includes a relatively long hub 43 with a relatively long engagement with the splined shaft and telescopes within the left ring 35 forming the extension from gear 12. The mounting member also includes a relatively long outer rim 44 encircling both of the rings 35 and is provided with the teeth 38 defining its outer perimeter. Between the hub 43 and the rim 44 is a rugged connecting web 45 provided with a plurality, in this case with six axially extending and equidistantly spaced apart apertures 46.

Positioned on opposite sides of the web 45 is a synchronizer in the form of a combined disk-like camming and clutch ring with the one on the left, 50, positioned between the web of the mounting member and the gear 12, and the one on the right, 51, similarly positioned between the web of the mounting member 37 and the gear 29. In each case the ring includes a flat annular thin cam plate 52 snugly engaging one side of the web 45 and positioned radially between the hub 43 and rim 44. The rings 50 and 51 are journalled on the hub 43 for rotary movement and are fixed against outward movement away from the web 45 by annular retaining rings 67 sprung into grooves 68 in the hub 43. The rings 50 and 51 each also include an axially extending rim or outer band 53 telescoping the ring 35 and having its inner periphery bevelled and provided with a facing of friction material 54 to coact with the adjacent axially fixed friction clutch element 36. The bevelled rim 53 will be hereinafter sometimes referred to as the shiftable or floating friction clutch element. The rim 53 in all cases is located within the adjacent end of the encircling gear-like rim 44 so that the rim 44 forms a shroud to protect the floating friction clutch element as is more fully described in my copending application Serial No. 568,261.

The mounting member 37 is provided midlength of its outer toothed surface with six spaced slip detent connections 63 with the normally shiftable slide member 39. The connections are located circumferentially between the camming means as shown in outline in Fig. 4. Each connection includes a spherical detent 64 having its outer surface extending slightly from the mounting member and projecting into a shallow groove 65 found on the inner toothed surface of the slide member 39. A backing spring 66 acts on the detent normally to maintain it in the groove as shown in Figs. 1 and 4.

Each plate 52 is provided with six equally spaced apertures 56 extending therethrough, and disposed in axial alignment with the apertures 46 in the web of the mounting member. These apertures 56 are preferably of frusto-conical form with the end of greater diameter facing the web. Positioned in each of the apertures 46 is a camming device 47 consisting in each instance of three spherical balls 69, 70 and 71 mounted to turn freely relative to each other and to the aperture or bore 46 in which they are contained. The three balls have a collective length slightly less than the distance between the stop faces 58 and 59 and normally disposed, as shown in Fig. 1, with the outer side of the end balls fitting in the adjacent aperture 56 in the floating cam element and in this case providing a slight clearance 72 between the ends of each ball and the adjacent stop face.

The modified showing of the structure in Fig. 5 corresponds in general to the showing in the preceding figures and the operation is the same. In Fig. 5 the flange 73 forming the shiftable friction clutch element extends interially of the ring 35 so that there is disclosed a friction element which engages with its fixed companion internally rather than externally as in the preceding figures. This design in the modified showing has an advantage in that the flange may be made quite thick and rugged without increasing the diametrical dimensions of the synchronizers.

There is also disclosed in Fig. 5 an arrangement for holding the synchronizers 50 and 51 from axial movement on the mounting member without necessity of using the separate retainers 67. In this case the synchronizer plates 52 are provided at their inner periphery with one or more lugs 74 which can slide in the groove 75 or grooves formed on the outer surface of the hub 43 and when the synchronizer abuts the web 45 as shown at the left side of Fig. 1 a slight rotary movement will shift the lugs into a circumference or bayonet slot groove 76 thus locking the synchronizers in place as shown in Fig. 6 and at the right side of Fig. 7 to prevent axial movement, while permitting the limited rotary, movement of the synchronizers on the mounting member.

In operation and assuming that the parts are in neutral position shown in Fig. 1, and that it is desired to synchronize the engine and propeller shafts prior to causing the shafts to be connected with each other directly or at high speed, shift fork 41 is in this case moved to the left carrying with it the slide unit 19 including the slide member 39, the mounting member 37 through the interposed slip detent connections together with the two synchronizers 50 and 51 and their associated camming devices 47. It is assumed that the shafts 11 and 14 are turning at different speeds and therefore the slide unit 19 and gear 12 are turning at different speeds. Under shifting pressure from the fork 41, the shift member 39, the mounting member 37 and both of the shiftable friction clutch elements 50 and 51 will be moved bodily to the left from the neutral position shown in Fig. 1 until the left friction clutch element 50 contacts with its companion 36 at which time the parts will be in the position shown in Fig. 2. The mounting member 37 will thus be held from further axial advance to the left but the slide member 39 will be free to depress the spherical detents 64 and continue its advance under the action of the shift fork as will hereinafter be more fully described. With the left-hand friction clutch elements thus engaged even lightly, the friction clutch as a whole will tend to rotate with the gear 12 and its associated engine driven parts. Any tendency of the clutch ring 50 to move relative to its mounting member 37 will cause the camming connection formed by the balls 69, 70 and 71 to react with a force dependent upon the difference of momentum between gear 12 and the parts associated therewith and the mounting member 37 and the turning vehicle parts associated therewith.

It will be understood that as the ring 50 tends to move past the inclined end of the left camming ball 69 the inclined sides of the aperture 56 will bear on the inclined side of the left ball and the first effect will be to shift all three balls bodily and axially until the right hand ball 71 engages the stop face 59 and thus prevents any further movement of the camming device towards the right as shown in Fig. 3. With the balls thus held from further retreat by means of the stop face 59, the left hand end of the camming device formed by the left hand ball 69 becomes fixed axially relative to a transverse plane through the same and any further relative rotary movement of the friction clutch element 50 relative to the mounting member will cause the floating friction clutch member in effect to attempt to move past the left hand ball and this will tend to shift the member 50 into a more intense clutching engagement with the conical friction surface 36 as shown in Fig. 3. Even if the left hand ball 69 should tend to rotate about its own axis, or center, this will have no effect on its camming action and any rotation of either of the end camming balls about their centers will simply have the effect of continuously presenting new contacting surfaces or points of contact to the associated floating friction clutch elements and the stop faces. The middle ball 70 simply acts as a spacer for the end balls 69 and 71 and provides an anti-friction middle thrust bearing for the camming device as a whole.

The continued movement of the shift fork 41 will cause the shift member 39 to move beyond the position which it assumes when the friction clutch became operative as shown in Fig. 3 and this manually shiftable movement of member 39 is continued until the teeth 42 thereof are in meshing engagement telescoping the teeth 33 of the gear 12. There is thus eventually provided a positive drive connection from shaft 11 through gear 12, teeth 33, teeth 42, teeth 38, mounting member 37, splines 21 to the propeller shaft 14.

In this way there is provided eventually a positive drive between the shafts 11 and 14 and which has been attained simply by shifting the manual lever controlling the shift fork 41 in the conventional manner to attain the desired gear combination.

In the subsequent unclutching movement the shift fork 41 is moved to the right and eventually the groove 65 will be moved into alignment with the detents 64 at which time the slip detent connections are re-established and the final shifting movement into neutral position shown in Fig. 1 will move the mounting member as a whole to the right and back into the neutral position shown in Fig. 1.

The act of shifting the slide unit back into its neutral position from the position shown in Fig. 3 will draw with it the previously engaged friction clutch element 50 thus breaking the frictional clutching connection. At the same time the line of balls will be forced by this action against the stop face 59 if not already in position engaging this stop face and through the balls react on the left floating clutch element to rerotate the same slightly back into its normal neutral position with the left ball seated in the recess 56 as shown in Fig. 1. In the event that for any reason the engaged friction clutch element 50 should become stuck to its companion 36, the shifting movement back to neutral of the unit as a whole will cause the camming device in its fixed engagement with the right hand stop face to act torsionally on the stuck element and thus tend to twist it free of its stuck engagement.

From this construction it is seen that the synchronizing friction clutch after having been actuated is automatically reset into inoperative position as an incident of restoring the gear control mechanism to its neutral position. It will be understood that the device operates when shifted to the right from its neutral position to cause in order, a manual shifting of the friction clutch element 52 into engagement with its companion on gear 29, a retreating movement from right to left of the line of balls until stopped by the left face 58, a reactory camming action between the right ball 71 and the floating element 52 with resulting jamming of this element into engagement with its companion as has been previously described for the left hand clutch engagement. It is also apparent that with this device it is impossible to have both synchronizers function at the same time for the synchronizing devices are rendered inoperative whenever the gear set control passes through its neutral position.

By means of the device herein disclosed it is apparent that there may be attained all of the advantages disclosed in the above identified copending application and that these advantages may be attained without the necessity of using the resetting spring for shifting the camming devices disclosed in that application. This omission of springs effects an economy in manufacturing costs and avoids necessity of providing space to accommodate these springs. As the camming balls may be obtained in the open market as conventional anti-friction bearing balls, there has been avoided the necessity of providing the specially formed pins of the prior application disclosure and in general the present disclosure features the providing of a camming device which can be readily replaced whenever the same becomes worn with other spherical balls which can be obtained as stock parts on the market.

While there has been shown, described and pointed out in the annexed claims, certain novel features of the invention, it will be understood that various omissions, substitutions and changes in the form and details of the device illustrated and in its operation may be made by those skilled in the art without departing from the spirit of the invention.

I claim:

1. In a device of the class described, the combination of a spline shaft, two power members mounted in axially spaced apart relation for rotary movement about the axis of the shaft and otherwise fixed against axial movement, each member provided with a stop face, one facing the other and each provided with an element of a positive clutch drive and with an element of a friction clutch drive, a slide unit splined to the shaft to turn therewith, located between the power members and having a limited axial sliding movement relative to both power members and including a mounting member sliding on the shaft, a pair of combined camming and clutch rings positioned on opposite sides of the mounting member, means for restraining the rings from axial movement relative to the mounting member and each ring provided with an element of a friction clutch drive coacting with the adjacent element on the power member to form a friction clutch drive between the shaft and each of the power members, each of the rings provided with an axially extending recess of frusto-conical form, a line of three contacting balls slidably mounted for axial movement in the mounting member, with a curved side of one of the end balls fitting in the recess of one of the rings and a side of the other end ball similarly fitting in the recess in the other ring, and said balls and ring each coacting to move the ring axially into frictionally clutching engagement with its associated friction clutch element on relative rotary movement of the ring and slide unit, said line of balls adapted to be shifted by such relative movement with its rear end in abutment with the stop face of the adjacent power member and thus axially fixed at its forward end, a slide member keyed to the mounting member to turn therewith and provided with elements of a positive clutch drive to engage selectively with the positive elements of one or the other power members to provide a positive drive between the shaft and which ever one of the power gears are engaged by the slide unit, a slip connection between the slide member and the mounting member for shifting the mounting member with the slide member to bring the friction clutch on the advancing side into operation and a shift fork engaging the slide member for successively causing the friction clutch and then the positive clutch on one or the other side to become effective depending on the direction of movement of the shift fork.

2. In a device of the class described, the combination of a power member mounted for rotary movement and otherwise fixed axially, said power member provided with an element of a friction clutch and an element of a positive clutch, a group of parts mounted for rotary movement about the axis of the power gear and each part movable axially relative to the power member, one of said parts constituting a mounting member, another part carried by the mounting member constituting the coacting element of the friction clutch, another part constituting the coacting element of the positive clutch and another part comprising a camming connection between the mounting member and the coacting clutch element for forcing said element into engagement with its companion, said camming connections including a spherical member carried by the mounting member and engaging in a recess in the friction clutch element and control means engaging said last named part for shifting the mounting member and with it the coacting friction clutch element into engagement with its companion and for shifting the positive element into engagement with its companion.

3. In a device of the class described, the combination of a spline shaft, a power member provided with an element of a positive clutch and an element of a friction clutch, a mounting member keyed to the shaft to turn therewith, a coacting friction element carried by the mounting member to turn therewith and capable of slight rotary movement relative thereto and fixed axially thereto, camming means between the coacting friction element and the mounting member operative incidental to said slight relative movement for shifting the coacting friction element into firm clutching engagement with its companion, said camming means including a ball journalled in the mounting member and engaging in an opening in the friction clutch element, a slide member turning with the mounting member and provided with the coacting element of the positive clutch and means between the slide member and mounting member for shifting the mounting member with the shifting of the slide member until the friction clutch becomes operative and thereafter permit the slide member to move beyond the shifted position of the mounting member to bring the positive clutch elements into interdriving relation.

4. In a device of the class described, the combination of a spline shaft, a power member mounted for rotary movement about the axis of the shaft, otherwise fixed against axial movement and provided with an element of a positive clutch and an element of a friction clutch, a mounting member keyed to the shaft to turn therewith, a combined camming and clutch ring carried by the mounting member, turning therewith and capable of slight relative rotary movement relative thereto and provided with the coacting element of the friction clutch and with a cam element, a camming ball carried by the mounting member and coacting with the cam element on the ring and acting by virtue of said slight relative rotary movement to force the coacting clutch element firmly into engagement with its companion, a slide member keyed to the mounting member to turn therewith and with the shaft provided with a coacting element of the positive clutch and a slip connection between the slide member and the mounting member.

5. In a device of the class described, the combination of an element of a friction clutch mounted for rotary movement, a mounting member mounted for rotary movement, a coacting element of the clutch disposed between the mounting member and the first named friction clutch element and provided with a recess facing the mounting member, a camming device comprising a line of balls carried by the mounting member and having one end located in said recess and coacting to form camming means for shifting the coacting element into engagement with its companion incidental to any rotary movement between the coacting element and said mounting member.

6. In a device of the class described, the combination of an element of a friction clutch mounted for rotary movement, a mounting member mounted for rotary movement, a coacting element of the clutch disposed between the mounting member and the first named friction clutch element and provided with a recess facing the mounting member, a camming device comprising a line of balls carried by the mounting member and having one end located in said recess and coacting to form camming means for shifting the coacting element into engagement with its companion incidental to any rotary movement between the coacting element and said mounting member, and a stop facing the opposite end of the line of balls and disposed for limiting the axial movement of the balls in the direction away from the clutch.

7. In a device of the class described, the combination of two friction clutches, with their movable elements between two relatively fixed elements, a single shift member between the movable elements and acting thereon to shift one of the movable elements into engagement with its companion while separating the other movable element from its companion, each of said movable elements provided with camming apertures extending therethrough, camming means including a plurality of balls disposed in line and having opposite ends intruded into the apertures and operating at one end on one of the movable elements to shift the same into engagement with its companion and stops on the outsides of the fixed elements disposed in position to limit the movement of the line of balls relative to the movable elements when reacting with one of the movable elements.

8. In a device of the class described, the combination of a fixed and movable element of a conical friction clutch, shiftable means for moving the movable element axially into engagement with the fixed element, a spherical camming device capable of rotating freely about its contained center and reacting between the movable element and said shiftable means for causing an intense clutching of the elements in an axial direction when the movable element moves relative to said shiftable means.

9. In a device of the class described, the combination of two power members, one provided with an element of a friction clutch and an element of a positive clutch, the other provided with a slidable unit turning therewith and including the coacting elements of the positive and friction clutches, a spherical ball constituting connecting means for rotating said coacting element of the friction clutch with said other power member and providing a cam engaging said coacting element of the friction clutch to force the same into engagement with its companion and an end thrust anti-friction bearing for said ball.

10. In a device of the class described, the combination of a friction clutch, including a movable element, a support for the movable element camming mechanism for forcing the movable element into engagement with its companion, said mechanism including a line of floating balls, guided in the support for movement to and from an operative position and otherwise normally free of restraint, an end ball of said line adapted to engage the movable element to shift the same towards its companion and stop means independent of the support for restraining any reactory movement of the ball away from the movable element.

11. In a device of the class described, the combination of a shaft, a pair of friction clutch elements mounted for rotary movement about the axis of the shaft and forming axially fixed stops, a slide member positioned between said pair of fixed elements, turning with the shaft and provided with two clutch elements coacting with the fixed elements to form two friction clutches, means for securing the two clutch elements from axial movement relative to the slide member and a single pressure means operatively responsive to a rotary movement about the shaft of either of the friction clutches when its elements are engaged and reacting against the stop provided by the fixed element of the other friction clutch to force the engaged elements more firmly into their clutched position.

12. In a device of the class described, the combination of the elements of a rotary friction clutch, control means for causing an initial engagement of said elements, camming means including a ball mounted for free rotary movement about its own center, and a coacting recess of fixed frusto-conical configuration in which one side of the ball intrudes and fits when the camming means is in its normal inoperative position, said camming means actuated by rotary movement of the clutch relative to the camming means for shifting the normal relation of the ball and its recess to cause an increase in the pressure of the initial engagement of the clutch elements.

13. In a device of the class described, the combination of the elements of a rotary friction clutch, camming means actuated by a rotary movement of the clutch relative to the same for forcing the clutch elements into a clutching relation, said means including a line of balls and a recess into which a side of one of the end balls intrudes and fits when the camming means is in its normal inoperative position, and a stop adapted to be engaged by the ball at the other end of the line for limiting the linear movement of the line of balls and thus hold the element of the camming means provided by the line of balls while the element provided with the recess bears against the ball in the recess and reacting thereon affects the camming action on the friction clutch.

14. In a springless cam actuated friction clutch, the combination of the relatively fixed element of a rotary friction clutch, an axially shiftable coacting element, camming means including a recess in the coacting element and a projection normally disposed in position fitting in the recess and coacting with the recess to cause the shiftable element to bear axially on the fixed element incidental to relative rotary movement of the shiftable element and the projection, control means movable in one axial direction to bear on and thus shift the shiftable element into engagement with the fixed element and movable in the other axial direction to rerotate the coacting element to its normal position and thus restore the projection into its normal position fitted in the recess in case the coacting element has been rotated to displace the recess from its normal position with the projections fitted therein.

15. In a springless synchronizing device, the combination of a positive clutch, a synchronizer for causing the elements of the positive clutch to approach the same speed, said synchronizer including the elements of a friction clutch mounted for rotary movement about a common axis, floating means normally free to revolve about said axis and having a limited freedom of axial movement, a stop for limiting the axial movement of said means and said means being operatively responsive to a rotary movement of the friction clutch for shifting said means into engagement with said stop and for reacting on the stop to press the elements of the friction clutch towards their clutching position.

16. In a device of the class described, the combination of a positive clutch, a springless synchronizing means for causing the elements of the positive clutch to approach the same speed, said means including the elements of a friction clutch, control means including a sliding mounting member operable in one direction for initially causing the elements to interengage, a camming device including a recess in one of the friction clutch elements and a coacting projection carried by the mounting member, and having one end normally fitted in the recess and operatively controlled by rotary movement of the friction clutch relative to said mounting member for increasing the initial pressure between the friction clutch elements, and means actuated by and energized solely by the movement of the control means in the opposite direction for positively releasing the friction clutch elements and relatively rerotating the recess and projection to restore the camming device into its normal position.

17. In a springless synchronizing device, the combination of a positive clutch, synchronizing means for causing the elements of the positive clutch to approach the same speed before being moved into interengagement, said means comprising the elements of a friction clutch including an axially movable element mounted for rotary movement about an axis and an axially fixed stop, floating mechanism including a line of balls disposed between the stop and the movable element and provided with means operatively controlled by the rotary movement of the movable element to force the same into engagement with its companion.

18. In a device of the class described, the combination of two power members, one provided with an element of a friction clutch, a slide unit turning with the other element and including the coacting element of the friction clutch, said coacting element provided with a circular opening extending therethrough, a ball mounted for rotary movement in the slide unit and having a diameter greater than the diameter of the opening, normally having one side fitting in and projecting through the opening, said ball and opening adapted when the slide unit is moved towards the friction clutch and the coacting element rotates relative to the ball to force the clutch elements together and stop means reacting on the ball when the slide member is moved in the opposite direction to rerotate the coacting element to fit the ball in the recess.

19. In a device of the class described, the combination of a normally inoperative friction clutch mounted for rotary movement about an axis and including an axially movable element, manual means for moving the axially movable element positively to and from its clutching engagement with its companion, camming mechanism for forcing the movable element into engagement with its companion, said mechanism including a ball adapted to engage the movable element to cam it into its clutching position, a support for the ball and said ball being free to revolve about its own center in said support and stopping means independent of the ball support for restraining the retreat of the ball away from said movable element.

HOWARD J. MURRAY.